(12) United States Patent
Bao et al.

(10) Patent No.: US 12,554,107 B2
(45) Date of Patent: Feb. 17, 2026

(54) ULTRA WIDE ANGLE LENS AND IMAGING DEVICE

(71) Applicant: JIANGXI LIANCHUANG ELECTRONIC CO., LTD., JiangXi (CN)

(72) Inventors: Yumin Bao, JiangXi (CN); Liufeng Liang, JiangXi (CN); Jiyong Zeng, JiangXi (CN)

(73) Assignee: JIANGXI LIANCHUANG ELECTRONIC CO., LTD., JiangXi (CN)

( * ) Notice: Subject to any disclaimer, the term of this patent is extended or adjusted under 35 U.S.C. 154(b) by 304 days.

(21) Appl. No.: 18/516,574

(22) Filed: Nov. 21, 2023

(65) Prior Publication Data

US 2024/0159995 A1 May 16, 2024

Related U.S. Application Data

(63) Continuation of application No. PCT/CN2022/094704, filed on May 24, 2022.

(30) Foreign Application Priority Data

May 25, 2021 (CN) .......................... 202110568307.1

(51) Int. Cl.
*G02B 9/64* (2006.01)
*G02B 13/00* (2006.01)
*G02B 13/06* (2006.01)

(52) U.S. Cl.
CPC .............. *G02B 13/06* (2013.01); *G02B 9/64* (2013.01); *G02B 13/0045* (2013.01)

(58) Field of Classification Search
None
See application file for complete search history.

(56) References Cited

U.S. PATENT DOCUMENTS

2020/0241248 A1* 7/2020 Chen .................. G02B 13/0045
2020/0301106 A1* 9/2020 Jung .................... G02B 13/002
(Continued)

FOREIGN PATENT DOCUMENTS

CN     103777332 A    5/2014
CN     109960020 A    7/2019
(Continued)

OTHER PUBLICATIONS

International Applicaiton No. PCT/2022/094704, International Search Report dated Aug. 2, 2022.
(Continued)

*Primary Examiner* — Darryl J Collins
(74) *Attorney, Agent, or Firm* — Patterson + Sheridan, LLP

(57) ABSTRACT

An ultra wide angle lens for an imaging device, arranged from the object side to the imaging plane, comprises: a first lens having a negative optical power with a convex object side surface, and a concave image side surface; a second lens having a negative optical power with concave object side and image side surfaces; a third lens having a positive optical power with convex object side and image side surfaces; a fourth lens having a positive optical power with convex object side and image side surfaces; a fifth lens having a positive optical power with convex object side and image side surfaces; a sixth lens having a negative optical power with concave object side and image side surfaces, and the fifth and sixth lens forming a bonded body; and a seventh lens having a positive optical power with paraxially convex object side and image side surfaces.

20 Claims, 7 Drawing Sheets

(56) References Cited

U.S. PATENT DOCUMENTS

| | | | | |
|---|---|---|---|---|
| 2020/0363609 A1* | 11/2020 | Bao | ........................ | G02B 13/18 |
| 2021/0011258 A1* | 1/2021 | Gao | ........................ | G02B 9/64 |
| 2022/0137332 A1* | 5/2022 | Lee | ........................ | G02B 13/18 |
| | | | | 359/708 |

FOREIGN PATENT DOCUMENTS

| | | |
|---|---|---|
| CN | 110133828 A | 8/2019 |
| CN | 210270348 U | 4/2020 |
| CN | 212965586 U | 4/2021 |
| CN | 113031230 A | 6/2021 |

OTHER PUBLICATIONS

International Applicaiton No. PCT/2022/094704, Written Opinion dated Aug. 2, 2022.

* cited by examiner

ULTRA WIDE ANGLE LENS AND IMAGING DEVICE

CROSS-REFERENCE TO RELATED APPLICATIONS

This application is a national phase application of PCT/CN2022/094704, filed on May 24, 2022, which claims priority to Chinese Patent Application No. 202110568307.1, filed on May 25, 2021, the contents of which are hereby incorporated by reference in their entireties for all purposes.

TECHNICAL FIELD

This disclosure relates to the technical field of imaging lens, and, in particular, to an ultra-wide angle lens and an imaging device.

BACKGROUND

With people's increasing requirements for driving safety and the constant improvement of Advanced Driving Assistance System (ADAS) technology, there has been an explosive growth in the market demand for vehicle-mounted cameras. By means of vehicle-mounted lenses carried on a vehicle for a front view, a rear view and a panoramic view, etc., the omnidirectional information about the inside and outside of the vehicle can be acquired, thereby assisting the driver to conduct correct driving behaviors. Hence, the adaptability of lenses to the environment and the stability of imaging have become safety guarantees during the running of an automobile.

Due to the complex and changeable application environment of an automobile and the high requirements for safety performance, higher requirements are put forward for vehicle-mounted lenses carried in ADAS, especially for lenses applied to the front and panoramic views of a vehicle, which not only need to have the strong environmental adaptability to ensure that the lenses can maintain a good resolution even in a high-and-low-temperature environment, but also need to have a large aperture to ensure the high-quality image output under different illumination conditions during the day and night, and meanwhile need to have an ultra-wide field angle so as to clearly record omnidirectional object and road information in front of and on the sides of the vehicle.

However, most vehicle-mounted lenses in the existing market usually have problems such as a small field angle (less than 160°), a low lens resolution, a large temperature drift, and an obvious chromatic aberration, and thus can hardly meet the use requirements of the aforesaid ADAS.

SUMMARY

To this end, the objectives of the present disclosure are to provide an ultra-wide angle lens with an ultra-wide angle, a low temperature drift, a low chromatic aberration and a high resolution, and an imaging device, so as to meet the use requirements in ADAS.

The embodiments of the present disclosure achieve the aforesaid objectives by the following technical solutions.

In the first aspect, this disclosure provides an ultra-wide angle lens, which, from the object side to the imaging plane along an optical axis, sequentially includes: a first lens with a negative focal power, the object side surface of the first lens being convex, and the image side surface of the first lens being concave; a second lens with a negative focal power, the object side surface and the image side surface of the second lens both being concave; a third lens with a positive focal power, the object side surface and the image side surface of the third lens both being convex; a fourth lens with a positive focal power, the object side surface and the image side surface of the fourth lens both being convex; a stop; a fifth lens with a positive focal power, the object side surface and the image side surface of the fifth lens both being convex; a sixth lens with a negative focal power, the object side surface and the image side surface of the sixth lens both being concave, and the fifth lens and the sixth lens forming a bonded body; and a seventh lens with a positive focal power, the object side surface and the image side surface of the seventh lens both being paraxially convex, wherein the ultra-wide angle lens satisfies a conditional expression below:

$$0.23 < \varphi_{behind}/\varphi < 0.28,$$

where $\varphi_{behind}$ represents a combined focal power of the fifth lens, the sixth lens, and the seventh lens, and $\varphi$ represents a focal power of the ultra-wide angle lens.

In the second aspect, the present disclosure provides an imaging device, including an imaging element, and an ultra-wide angle lens provided in the first aspect, the imaging element used for converting an optical image formed by the ultra-wide angle lens into an electrical signal.

Compared with the existing technology, in an ultra-wide angle lens provided in the present disclosure, seven lenses with particular refractive powers are reasonably arranged, such that the lens has an field angle of 180°, and can achieve an ultra-wide range of picture shooting. All-glass lenses are used, such that the lens has the good thermal stability, and a focal point offset caused by the temperature change can be effectively compensated for. Meanwhile, the surface shape of each lens and the position of the stop are set reasonably, such that the aberration of the lens is corrected well, and thereby the lens has a high-definition resolution.

BRIEF DESCRIPTION OF THE DRAWINGS

The foregoing and/or additional aspects and advantages of the present disclosure will become apparent and readily understood from the following description of the embodiments in view of the drawings, in which.

DETAILED DESCRIPTION

Figure 1:
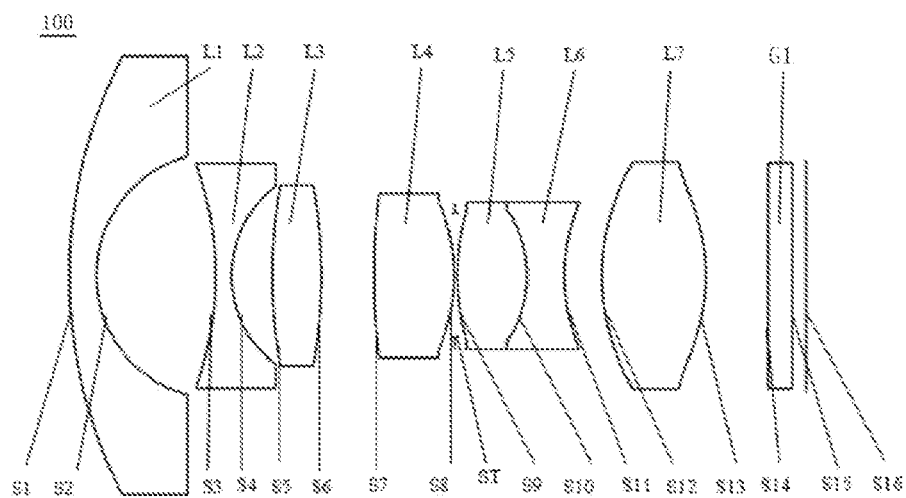
FIG. 1 is a structural schematic diagram of an ultra-wide angle lens in accordance with a first embodiment of the present disclosure.

To make the objectives, features, and advantages of the present disclosure obvious and understandable, the specific modes of implementation of the present disclosure will be described below in detail with reference to the drawings. Several embodiments of the present disclosure are illustrated in the drawings. However, the present disclosure may be implemented in many different forms, and is not limited to the embodiments described herein. Rather, these embodiments are provided for the purpose of making the contents of the present disclosure more thorough and complete.

Unless defined otherwise, all the technical and scientific terms used herein carry the same meaning as commonly understood by those skilled in the art to which the present disclosure belongs. The terms are used in the specification of the present disclosure only for the purpose of describing specific embodiments, instead of imposing limitations on the present disclosure. Like reference signs refer to like elements throughout the specification.

The present disclosure provides an ultra-wide angle lens, which, from the object side to the imaging plane along an optical axis, sequentially including: a first lens, a second lens, a third lens, a fourth lens, a stop, a fifth lens, a sixth lens, a seventh lens, and an optical filter.

The first lens is a meniscus lens having a negative focal power, the object side surface thereof being convex, and the image side surface thereof being concave. Providing a meniscus lens as the first lens can not only effectively reduce the spherical aberration and field curvature of the lens, but also allow more light rays to enter the lens, and increase the shooting range of the lens. Moreover, the first lens satisfies: Nd1>1.8, and Vd1 >42, where Nd1 represents a material refractive index of the first lens, and Vd1 represents a material Abbe number of the first lens. The use of a glass material with a high refractive index for the first lens can not only effectively reduce the diameter of the first lens, but also reduce the chromatic aberration in the system.

The second lens is a biconcave lens having a negative focal power, the object side surface and the image side surface thereof both being concave. The second lens can diverge the light rays passing through the first lens, and make the light rays tend to be smooth and transition to the rear of the lens.

The third lens is a biconvex lens having a positive focal power, and meanwhile satisfies the conditional expression: R5+R6=0, where R5 represents a radius of curvature of the object side surface of the third lens, and R6 represents a radius of curvature of the image side surface of the third lens, i.e., the magnitudes of curvature of the object side surface and the image side surface of the third lens are equal, and then the third lens is a biconvex lens having two symmetrical surfaces, simplifying the processing and assembly procedures, and reducing the production costs.

The fourth lens has a positive focal power, the object side surface and the image side surface thereof both being convex.

The stop arranged between the fourth lens and the fifth lens can balance the number of the lenses having positive and negative focal powers contained in the lens groups in front of and behind the stop, effectively correcting the distortion, and improving the resolution capability of the lens at an edge. If the stop is placed between the third lens and the fourth lens, the lens group behind the stop contains too many positive lenses (i.e., three positive lenses and one negative lens), this may result in a too large focal power shared by the negative lens, being unbeneficial to the distortion correction in the entire system.

The fifth lens has a positive focal power, the object side surface and the image side surface thereof both being convex.

The sixth lens has a negative focal power, the object side surface and the image side surface thereof both being concave, and the fifth lens and the sixth lens forms an achromatic glued lens, which can effectively reduce chromatic aberrations.

The seventh lens has a positive focal power, the object side surface and the image side surface thereof both being paraxially convex. Using an aspherical lens as the seventh lens can improve the resolution of the lens and reduce aberrations.

The optical filter is provided between the seventh lens and the imaging plane.

Herein, the seventh lens is an aspherical glass lens, and the other lenses are all spherical glass lenses. A full-glass structure used for the ultra-wide angle lens can effectively prolong the service life of the lens, and meanwhile enable the lens to have the good thermal stability, so as to maintain a better resolution even in a high-and-low-temperature environment.

In some modes of implementation, the ultra-wide angle lens satisfies the conditional expressions below:

$$9.5 < TTL/f < 10; \qquad (1)$$

$$1.8 < D/IH_{max} < 1.9; \qquad (2)$$

where TTL represents a total track length of the ultra-wide angle lens, f represents a focal length of the ultra-wide angle lens, D represents an effective diameter of the ultra-wide angle lens, and $IH_{max}$ represents the maximum true image height of the ultra-wide angle lens.

When the aforesaid conditional expressions (1) and (2) are satisfied, the total length and the diameter of the lens can be better controlled in the case of a fixed focal length and image height, achieving the miniaturization of the lens.

Further, the ultra-wide angle lens satisfies the conditional expression below:

$$0.65 < f^*\sin\theta/IH_{max} < 0.70, \qquad (3)$$

where f represents a focal length of the ultra-wide angle lens, θ represents a half field angle of the ultra-wide angle lens, and $IH_{max}$ represents the maximum true image height of the ultra-wide angle lens. When the aforesaid conditional expression (3) is satisfied, the lens can be enabled to have a more suitable image height position in an edge field of view, effectively controlling a distortion of the lens, and improving the edge imaging capability of the lens.

In some modes of implementation, the ultra-wide angle lens satisfies the conditional expression below:

$$0.1 < BFL/T_L < 0.2; \qquad (4)$$

where BFL represents an optical back focal length of the ultra-wide angle lens, and $T_L$ represents a distance from the object side surface of the first lens to the image side surface of the seventh lens on the optical axis.

When the aforesaid conditional expression (4) is satisfied, the total track length of the lens can be maximized by reasonably allocating a ratio of the back focal length to the lens group length, and meanwhile the back focal length is increased, and the assembly difficulty between the lens and an imaging chip is reduced.

In some modes of implementation, the ultra-wide angle lens satisfies the conditional expressions below:

$$Nd1 > 1.8; \qquad (5)$$

$$Vd1 > 42; \qquad (6)$$

wherein Nd1 represents a material refractive index of the first lens, and Vd1 represents a material Abbe number of the first lens. The first lens is made of a material having a high refractive index, which is beneficial for reducing the front-end diameter of the optical system and improving the imaging quality of the system especially when the material of the first lens satisfies the aforesaid conditional expressions (5) and (6).

In some modes of implementation, the first lens satisfies the conditional expressions below:

$$-8.2 \text{ mm} < f1 < -7.2 \text{ mm}; \qquad (7)$$

$$17 \text{ mm} < R1 < 19 \text{ mm}; \qquad (8)$$

$$4 \text{ mm} < R2 < 5 \text{ mm}; \qquad (9)$$

$$3.5 < R1/R2 < 4.0; \qquad (10)$$

where f1 represents a focal length of the first lens, R1 represents a radius of curvature of the object side surface of the first lens, and R2 represents a radius of curvature of the image side surface of the first lens.

When the aforesaid conditional expressions (7) to (10) are satisfied, the surface shape of the first lens can be reasonably set to enhance the ability of the first lens to collect light rays, thereby achieving a super large field angle of 180°. If R1 exceeds the upper limit value, an angle of incidence of the light rays will be too large, affecting the relative illuminance. If R2 exceeds the upper limit value, an angle of emergence of the light rays will be too large, being unbeneficial to the correction to the field curvature. If R2 is below the lower limit value, a hyper-hemisphere will be caused, being unbeneficial to lens processing.

In some modes of implementation, the ultra-wide angle lens satisfies the conditional expression below:

$$1 < f1/f2 < 1.5; \qquad (11)$$

where f1 represents a focal length of the first lens, and f2 represents a focal length of the second lens.

Because light rays within an ultra large range of greater than 180° are to be collected, there will be a large angle of incidence of light rays entering the first lens, being unbeneficial to correction to aberrations in different fields of view (especially an edge field of view) after incidence of the light rays. When the aforesaid conditional expression (11) is satisfied, the angle of emergence of the light rays can be effectively reduced by properly matching the focal powers of the first and second lenses, such that the angle between the emergent light rays passing through the second lens and the optical axis decreases, and then the emergent light rays transition smoothly to the subsequent lenses, so as to facilitate correction to optical aberrations in the subsequent optical system.

In some modes of implementation, the ultra-wide angle lens satisfies the conditional expression below:

$$2 < f3/f4 + R5/R7 < 3; \qquad (12)$$

where f3 represents a focal length of the third lens, f4 represents a focal length of the fourth lens, R5 represents a radius of curvature of the object side surface of the third lens, and R7 represents a radius of curvature of the object side surface of the fourth lens. Because both the third and fourth lenses are lenses having positive focal powers and are arranged in the vicinity of the stop, they are highly sensitive to tolerances. When the aforesaid conditional expression (12) is satisfied, the tolerance sensitivity of the third and fourth lenses may be reduced, the lens yield may be increased, and the costs may be lowered.

In some modes of implementation, the ultra-wide angle lens satisfies the conditional expression below:

$$-20 \text{ mm}^2 < f5*f6 < -15 \text{ mm}^2; \qquad (13)$$

where f5 represents a focal length of the fifth lens, and f6 represents a focal length of the sixth lens. When the aforesaid conditional expression (13) is satisfied, the field curvature of the lens can be effectively corrected, and the resolution of the lens be enhanced.

In some modes of implementation, the ultra-wide angle lens satisfies the conditional expression below:

$$0.23 < \varphi_{behind}/\varphi < 0.28; \qquad (14)$$

where $\varphi_{behind}$ represents a combined focal power of the fifth lens, the sixth lens, and the seventh lens, and $\varphi$ represents an focal power of the ultra-wide angle lens. When the aforesaid conditional expression (14) is satisfied, the chromatic lateral aberration of the system can be effectively corrected by setting the proportion of the focal power of the lens group behind the stop.

In some modes of implementation, the ultra-wide angle lens satisfies the conditional expression below:

$$0.35 < \varphi7/\varphi < 0.45; \qquad (15)$$

where $\varphi7$ represents an focal power of the seventh lens, and $\varphi$ represents an focal power of the ultra-wide angle lens. When the aforesaid conditional expression (15) is satisfied, the astigmatism of the lens may be effectively corrected by reasonably setting the focal power of the seventh lens, and the resolution of the lens may be enhanced.

In some modes of implementation, the ultra-wide angle lens satisfies the conditional expression below:

$$-3 \times 10^{-6}/°C. < (dn/dt)4 + (dn/dt)5 + (dn/dt)6 < -2 \times 10^{-6}/°C.; \qquad (16)$$

where (dn/dt)4 represents a temperature coefficient of material refractive index of the fourth lens, (dn/dt)5 represents a temperature coefficient of material refractive index of the fifth lens, and (dn/dt)6 represents a temperature coefficient of material refractive index of the sixth lens. When the aforesaid conditional expression (16) is satisfied, it can be ensured that the lens has a small focal point offset and stable imaging performance in an environment of −40° C.~125° C. by reasonably allocating the thermal expansion coefficient of each lens.

In some modes of implementation, the ultra-wide angle lens satisfies the conditional expressions below:

$$0.5 \text{ mm} < CT2 < 0.68 \text{ mm}; \quad (17)$$

$$4.0 \text{ mm} < CT12 < 5.2 \text{ mm}; \quad (18)$$

$$0.95 \text{ mm} < CT23 < 1.7 \text{ mm}; \quad (19)$$

$$1.1 \text{ mm} < CT67 < 2.0 \text{ mm}; \quad (20)$$

where CT2 represents a center thickness of the second lens, CT12 represents a spacing distance between the first lens and the second lens on the optical axis, CT23 represents a spacing distance between the second lens and the third lens on the optical axis, and CT67 represents a spacing distance between the sixth lens and the seventh lens on the optical axis. When the aforesaid conditional expressions (17) to (20) are satisfied, the distribution of the light rays can be effectively adjusted by reasonably setting the thickness of each lens and air spacings, the sensitivity of the lens be reduced, and meanwhile the structure of the lens be made more compact.

The present disclosure will be further explained in multiple embodiments below. In each embodiment, the lenses in the ultra-wide angle lens are partially different in thickness, radius of curvature, and material selection. The specific differences can be referred to in the parameter table of each embodiment. The following embodiments are only some preferred modes of implementation of the present disclosure, but the modes of implementation of the present disclosure are not limited to the following embodiments. Any other changes, substitutions, combinations, or simplifications that do not depart from the innovative gist of the present disclosure should be considered as equivalent modes of replacement, and be included within the scope of protection of the present disclosure.

The surface shape of any aspheric surface of the ultra-wide angle lens in each embodiment of the present disclosure satisfies the following equation:

$$z = \frac{ch^2}{1 + \sqrt{1 - (1+K)c^2h^2}} + Bh^4 + Ch^6 + Dh^8 + Eh^{10} + Fh^{12}$$

where z represents a distance of the curved surface away from the apex of the curved surface in the optical axis direction, c represents a curvature of the apex of the curved surface, K represents a coefficient of the quadric curved surface, h represents a distance from the optical axis to the curved surface, and B, C, D, E and F represent coefficients of the fourth, sixth, eighth, tenth and twelfth order curved surfaces respectively.

First Embodiment

Please refer to FIG. 1, which illustrates a structural schematic diagram of an ultra-wide angle lens 100 provided in accordance with a first embodiment of the present disclosure. The ultra-wide angle lens 100, from the object side to the imaging plane along an optical axis, sequentially includes: a first lens L1, a second lens L2, a third lens L3, a fourth lens L4, a stop ST, a fifth lens L5, a sixth lens L6, a seventh lens L7, and an optical filter G1.

The first lens L1 has a negative focal power, the object side surface S1 thereof being convex, and the image side surface S2 thereof being concave.

The second lens L2 has a negative focal power, the object side surface S3 and the image side surface S4 thereof both being concave.

The third lens L3 has a positive focal power, the object side surface S5 and the image side surface S6 thereof both being convex.

The fourth lens L4 has a positive focal power, the object side surface S7 and the image side surface S8 thereof both being convex.

The fifth lens L5 has a positive focal power, the object side surface S9 and the image side surface thereof both being convex.

The sixth lens L6 has a negative focal power, the object side surface and the image side surface S11 thereof both being concave, and the image side surface of the fifth lens and the object side surface of the sixth lens are glued together to form a bonded lens, the bonded surface thereof being S10.

The seventh lens L7 has a positive focal power, the object side surface S12 and the image side surface S13 thereof being paraxially convex.

The first lens L1, the second lens L2, the third lens L3, the fourth lens L4, the fifth lens L5, and the sixth lens L6 are glass spherical lenses, and the seventh lens L7 is a glass aspherical lens.

The relevant parameters of each lens in the ultra-wide angle lens 100 provided in accordance with the first embodiment of the present disclosure are listed in Table 1.

TABLE 1

| Surface No. | | Radius of Curvature (mm) | Thickness (mm) | Refractive Index | Abbe Number |
|---|---|---|---|---|---|
| | Object Surface | infinity | — | | |
| S1 | First Lens L1 | 17.846 | 1.000 | 1.804 | 46.57 |
| S2 | | 4.601 | 4.356 | | |
| S3 | Second Lens L2 | −12.548 | 0.617 | 1.488 | 70.42 |
| S4 | | 4.337 | 1.543 | | |
| S5 | Third Lens L3 | 21.284 | 1.634 | 1.805 | 25.48 |
| S6 | | −21.284 | 1.534 | | |
| S7 | Fourth Lens L4 | 21.877 | 4.106 | 1.729 | 54.67 |
| S8 | | −7.313 | 0.071 | | |
| ST | Stop ST | infinity | 0.083 | | |
| S9 | Fifth Lens L5 | 7.686 | 2.887 | 1.593 | 68.53 |
| S10 | Sixth Lens L6 | −4.574 | 0.697 | 1.762 | 26.61 |
| S11 | | 7.218 | 1.808 | | |
| S12 | Seventh Lens L7 | 7.483 | 3.468 | 1.554 | 71.72 |
| S13 | | −7.516 | 2.300 | | |
| S14 | Optical Filter G1 | infinity | 0.400 | 1.517 | 64.21 |
| S15 | | infinity | 0.945 | | |
| S16 | Imaging Plane | infinity | — | | |

The aspheric parameters of the seventh lens L7 in this embodiment are listed in Table 2.

TABLE 2

| Surface No. | K | B | C | D | E | F |
|---|---|---|---|---|---|---|
| S12 | −3.595 | 9.017E−5 | 4.796E−5 | −3.474E−6 | 1.942E−7 | −3.486E−9 |
| S13 | −2.602 | 3.606E−4 | −1.788E−5 | 4.611E−6 | −2.012E−7 | 4.248E−9 |

Figure 2:
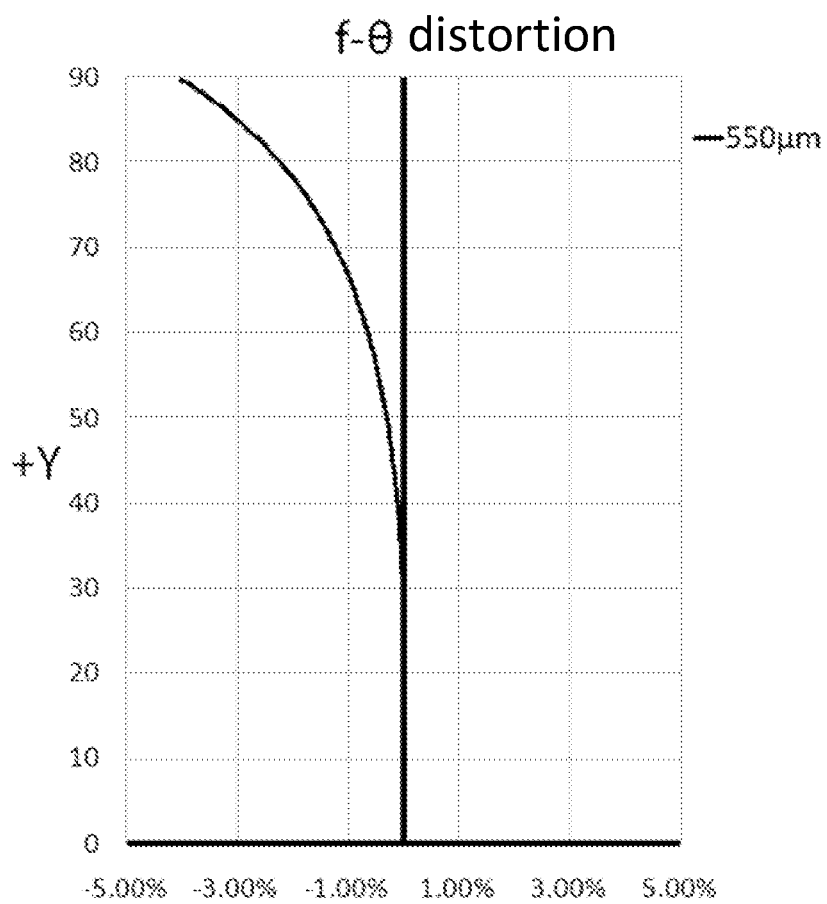
FIG. 2 is an f-θ distortion graph of the ultra-wide angle lens in accordance with the first embodiment of the present disclosure.
Figure 3:
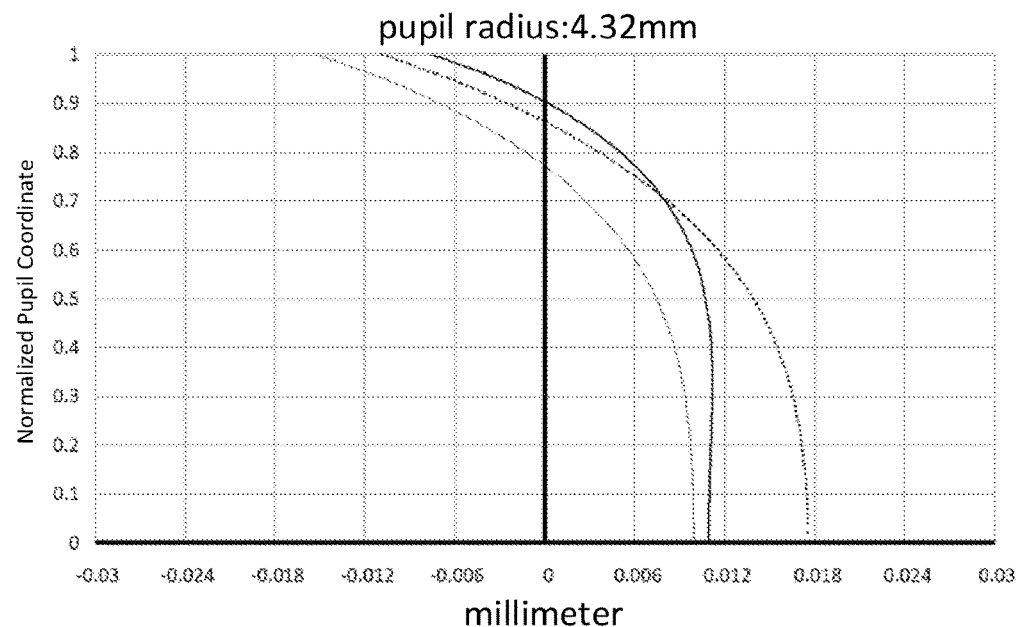
FIG. 3 is an axial chromatic aberration graph of the ultra-wide angle lens in accordance with the first embodiment of the present disclosure.
Figure 4:
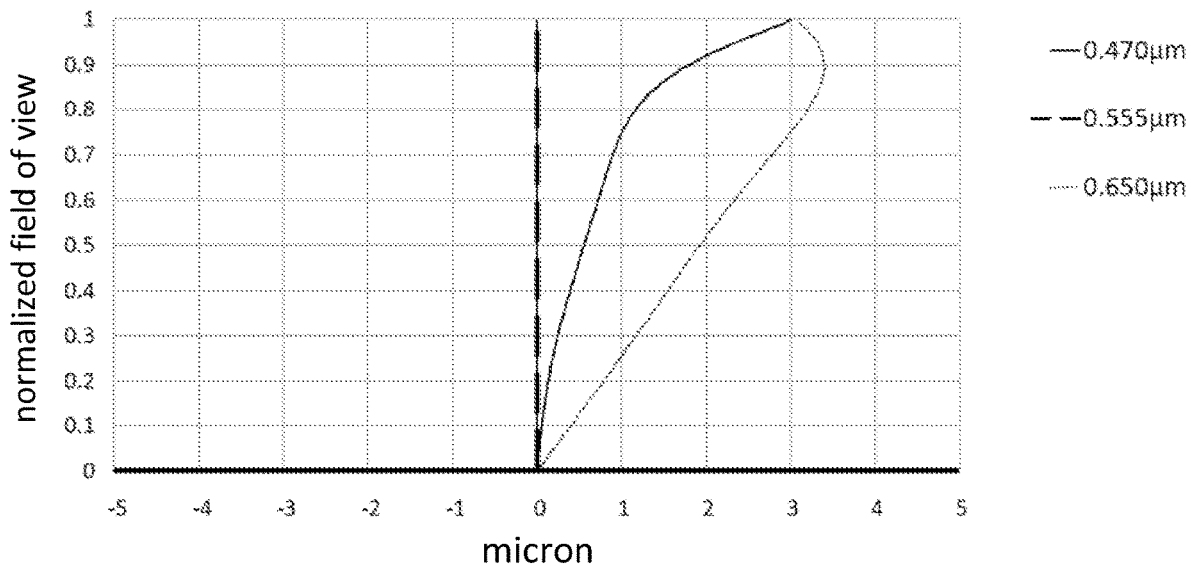
FIG. 4 is a chromatic lateral aberration graph of the ultra-wide angle lens in accordance with the first embodiment of the present disclosure.

In this embodiment, graphs of f-θ distortion, axial chromatic aberration and chromatic lateral aberration of the ultra-wide angle lens 100 are shown in FIG. 2, FIG. 3, and FIG. 4, respectively.

The distortion curve in FIG. 2 represents distortions corresponding to different image heights in the imaging plane. In the figure, the vertical axis represents an field angle, and the horizontal axis represents a distortion value. As can be seen from FIG. 2, the optical distortions of the ultra-wide angle lens 100 are within −5% in the full field of view, and are negative distortions, indicating that the distortions have been well corrected.

The axial chromatic aberration curves in FIG. 3 represent aberrations at the imaging plane on the optical axis. In the figure, the horizontal axis represents an axial chromatic aberration value (in millimeter), and the vertical axis represents a normalized pupil radius. As can be seen from FIG. 3, the offsets of the axial chromatic aberrations are controlled within ±0.018 millimeter, indicating that the lens can effectively correct the aberration of an edge field of view and the secondary spectrum of the entire image plane.

The chromatic lateral aberration curves in FIG. 4 represent the chromatic aberration of each wavelength with respect to a central wavelength (0.550 μm) at different image heights in the imaging plane. In the figure, the horizontal axis represents a chromatic lateral aberration value (in micron) of each wavelength with respect to the central wavelength, and the vertical axis represents a normalized field angle. As can be seen from FIG. 4, the chromatic lateral aberrations of the longest wavelength and the shortest wavelength are controlled within ±3.5 microns, indicating that the chromatic lateral aberrations of the lens have been well corrected.

Second Embodiment

Figure 5:
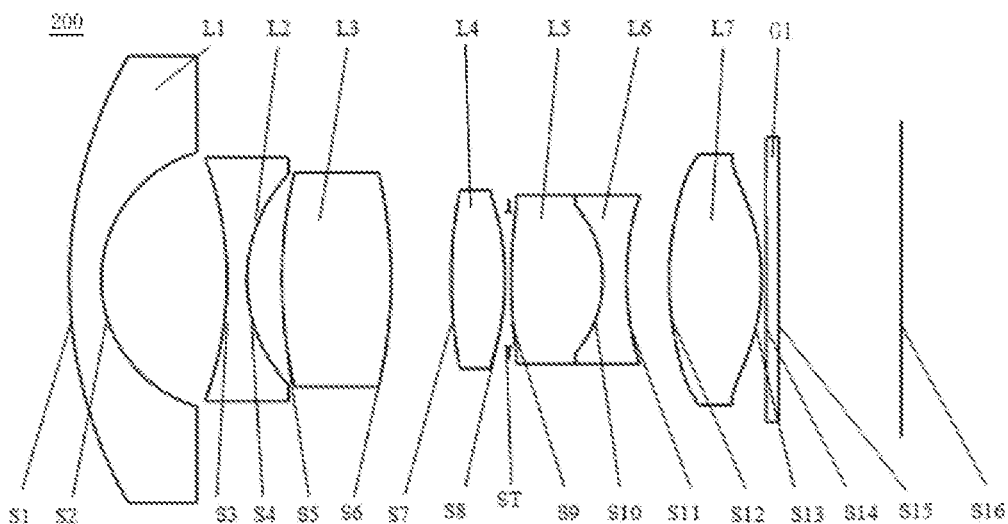
FIG. 5 is a structural schematic diagram of an ultra-wide angle lens in accordance with a second embodiment of the present disclosure.

Please refer to FIG. 5, which is a structural schematic diagram of an ultra-wide angle lens 200 provided in accordance with a second embodiment of the present disclosure. The structural schematic diagram of the ultra-wide angle lens 200 provided in the second embodiment is basically the same as that of the ultra-wide angle lens 100 in the first embodiment. The differences therebetween lie in the radius of curvature and material selection of each lens of the ultra-wide angle lens 200 in this embodiment. The relevant parameters of each lens are specifically listed in Table 3.

TABLE 3

| Surface No. | | Radius of Curvature (mm) | Thickness (mm) | Refractive Index | Abbe Number |
|---|---|---|---|---|---|
| | Object Surface | infinity | — | | |
| S1 | First Lens L1 | 18.208 | 1.000 | 1.8348 | 42.73 |
| S2 | | 4.564 | 4.996 | | |
| S3 | Second Lens L2 | −10.135 | 0.672 | 1.5923 | 68.53 |
| S4 | | 5.175 | 1.035 | | |
| S5 | Third Lens L3 | 15.923 | 2.900 | 1.9537 | 32.32 |
| S6 | | −15.923 | 1.819 | | |

TABLE 3-continued

| Surface No. | | Radius of Curvature (mm) | Thickness (mm) | Refractive Index | Abbe Number |
|---|---|---|---|---|---|
| S7 | Fourth Lens L4 | 13.503 | 2.167 | 1.697 | 55.53 |
| S8 | | −8.470 | −0.055 | | |
| ST | Stop ST | infinity | 0.311 | | |
| S9 | Fifth Lens L5 | 14.391 | 3.112 | 1.593 | 68.53 |
| S10 | Sixth Lens L6 | −3.604 | 1.333 | 1.7612 | 26.61 |
| S11 | | 8.599 | 1.144 | | |
| S12 | Seventh Lens L7 | 9.826 | 2.614 | 1.613 | 60.61 |
| S13 | | −6.251 | 0.150 | | |
| S14 | Optical Filter G1 | infinity | 0.400 | 1.517 | 64.21 |
| S15 | | infinity | 3.766 | | |
| S16 | Imaging Plane | infinity | — | | |

The aspheric parameters of the seventh lens L7 in this embodiment are listed in Table 4.

TABLE 4

| Surface No. | K | B | C | D | E | F |
|---|---|---|---|---|---|---|
| S12 | −3.876 | −6.580E−4 | 8.800E−5 | −6.025E−6 | 5.725E−7 | −1.155E−8 |
| S13 | −0.786 | 3.807E−4 | −4.523E−5 | 1.425E−5 | −1.292E−6 | 5.492E−8 |

Figure 6:
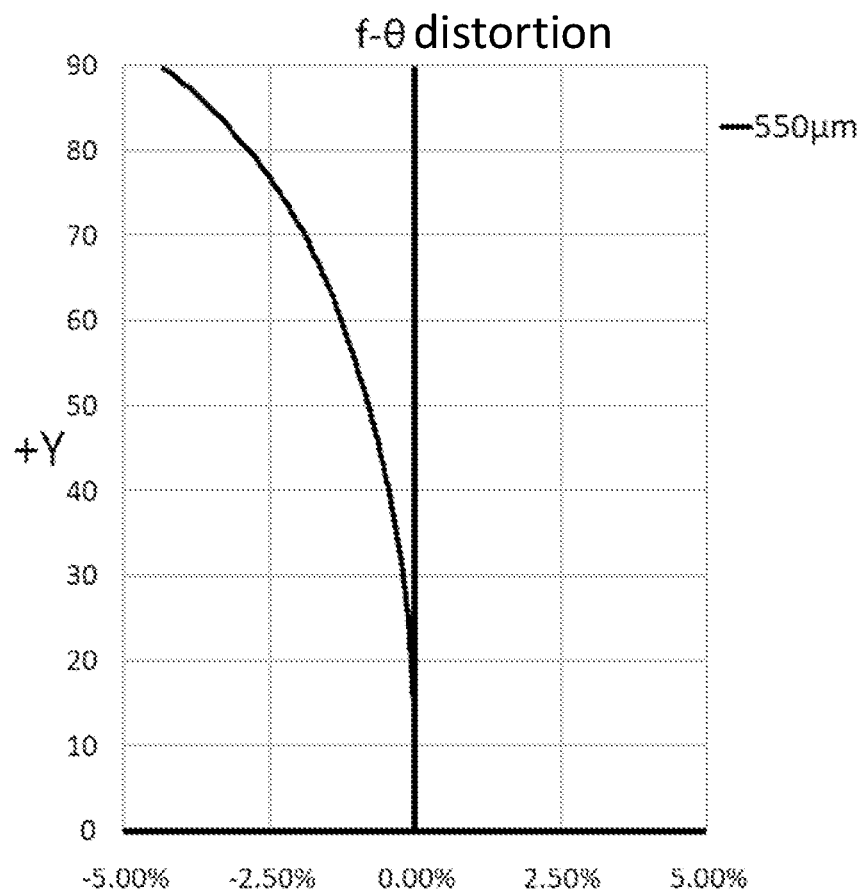
FIG. 6 is an f-θ distortion graph of the ultra-wide angle lens in accordance with the second embodiment of the present disclosure.
Figure 7:
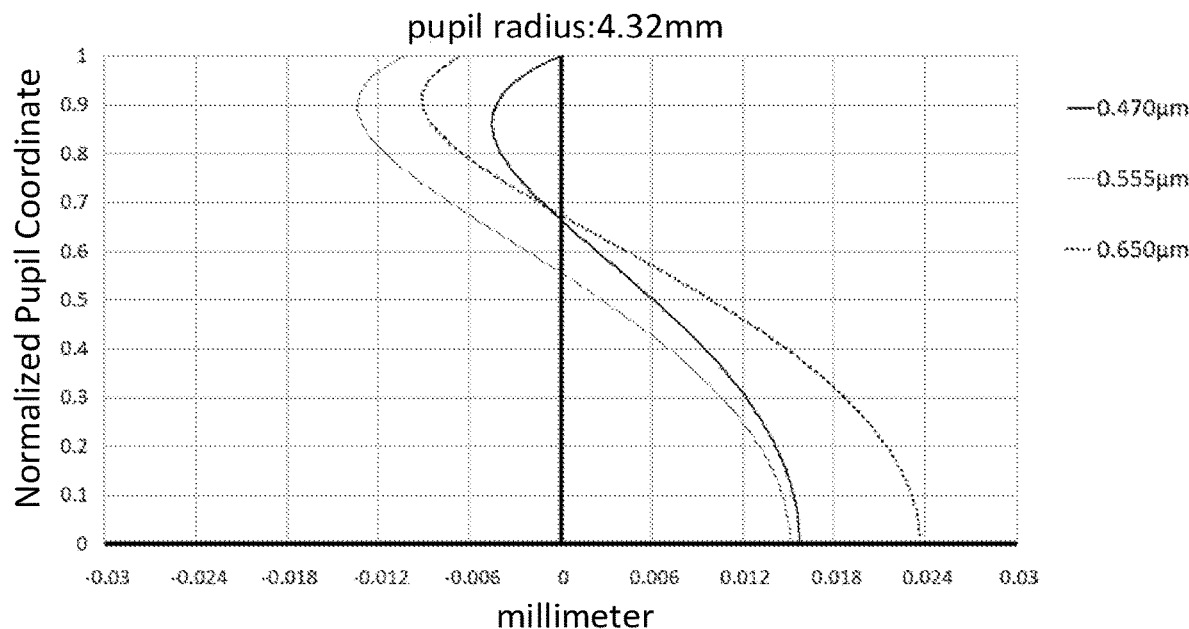
FIG. 7 is an axial chromatic aberration graph of the ultra-wide angle lens in accordance with the second embodiment of the present disclosure.
Figure 8:
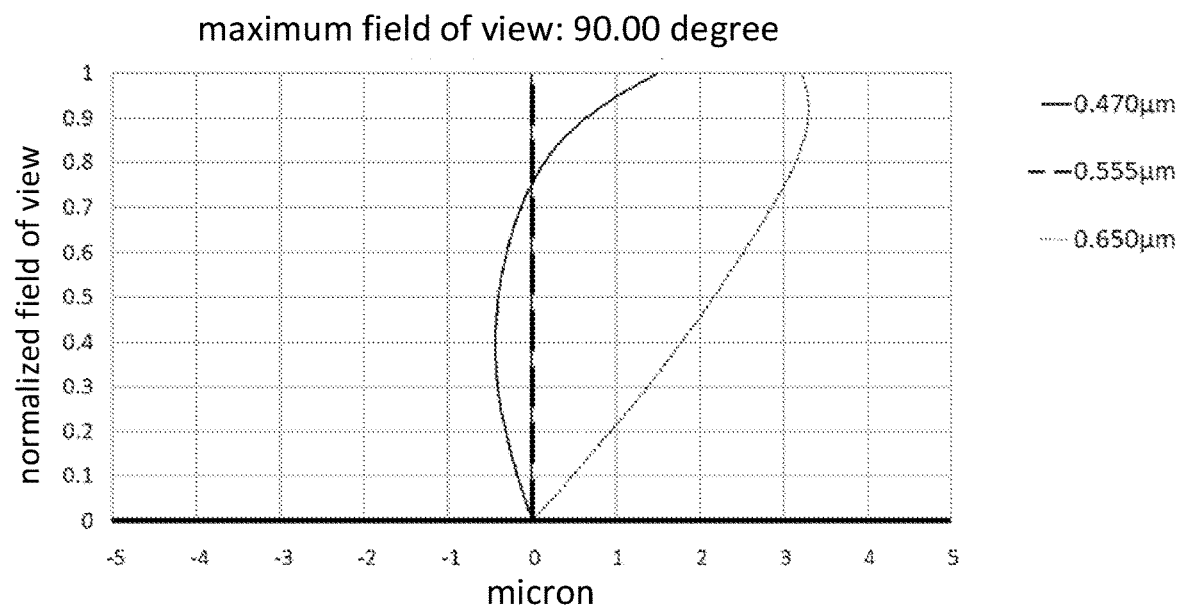
FIG. 8 is a chromatic lateral aberration graph of the ultra-wide angle lens in accordance with the second embodiment of the present disclosure.

In this embodiment, graphs of f-θ distortion, axial chromatic aberration and chromatic lateral aberration of the ultra-wide angle lens 200 are shown in FIG. 6, FIG. 7, and FIG. 8, respectively.

As can be seen from FIG. 6, the optical distortions of the ultra-wide angle lens 200 are within −5% in the full field of view, and are negative distortions, indicating that the distortions have been well corrected.

As can be seen from FIG. 7, the offsets of the axial chromatic aberrations are controlled within ±0.024 millimeter, indicating that the ultra-wide angle lens 200 can effectively correct the aberration of an edge field of view and the secondary spectrum of the entire image plane.

As can be seen from FIG. 8, the chromatic lateral aberrations of the longest wavelength and the shortest wavelength are controlled within ±3.5 microns, indicating that the chromatic lateral aberrations of the ultra-wide angle lens 200 have been well corrected.

Third Embodiment

Figure 9:
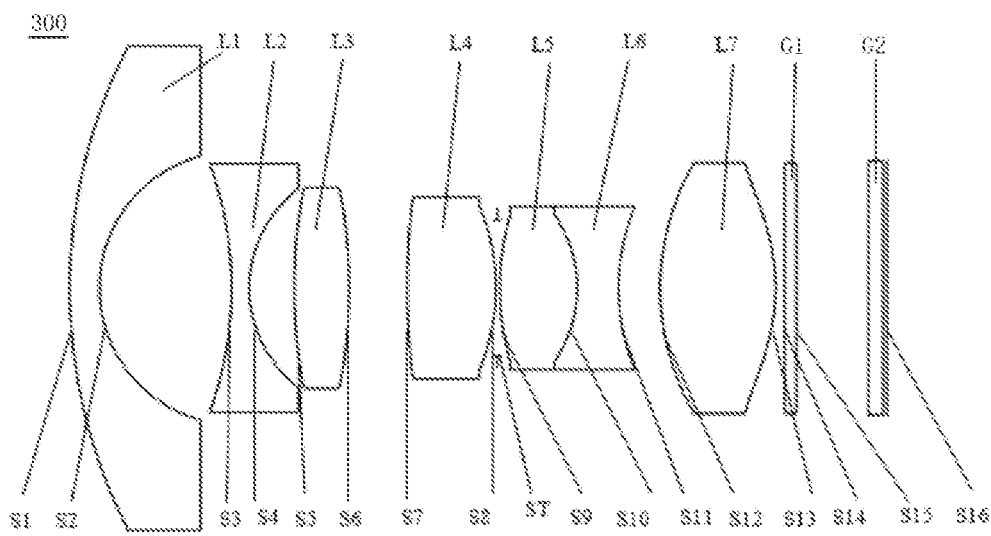
FIG. 9 is a structural schematic diagram of an ultra-wide angle lens in accordance with a third embodiment of the present disclosure.

Please refer to FIG. 9, which is a structural schematic diagram of an ultra-wide angle lens 300 provided in accordance with a third embodiment of the present disclosure. The structural schematic diagram of the ultra-wide angle lens 300 provided in the third embodiment is basically the same as that of the ultra-wide angle lens 100 in the first embodiment. The differences therebetween lie in a protective glass G2 added between the optical filter G1 and the imaging plane 816 in the ultra-wide angle lens 300 of this embodiment. The protective glass G2 can better protect the sensor chip, and provide better imaging quality. The differences therebetween also lies in the radius of curvature, thickness, and so on of each lens. The relevant parameters of each lens are specifically listed in Table 5.

TABLE 5

| Surface No. | | Radius of Curvature (mm) | Thickness (mm) | Refractive Index | Abbe Number |
|---|---|---|---|---|---|
| | Object Surface | infinity | — | | |
| S1 | First Lens L1 | 17.465 | 1.000 | 1.804 | 46.57 |
| S2 | | 4.606 | 4.437 | | |
| S3 | Second Lens L2 | −12.253 | 0.598 | 1.488 | 70.42 |
| S4 | | 4.189 | 1.510 | | |
| S5 | Third Lens L3 | 18.299 | 1.835 | 1.805 | 25.48 |
| S6 | | −18.299 | 1.955 | | |
| S7 | Fourth Lens L4 | 23.939 | 2.978 | 1.729 | 54.67 |
| S8 | | −7.127 | 0.043 | | |
| ST | Stop ST | infinity | 0.089 | | |
| S9 | Fifth Lens L5 | 8.729 | 2.598 | 1.593 | 68.53 |
| S10 | Sixth Lens L6 | −4.394 | 1.390 | 1.762 | 26.61 |
| S11 | | 7.057 | 1.391 | | |
| S12 | Seventh Lens L7 | 7.530 | 3.886 | 1.554 | 71.72 |
| S13 | | −6.531 | 0.300 | | |
| S14 | Optical Filter G1 | infinity | 0.400 | 1.517 | 64.21 |
| S15 | | infinity | 2.411 | | |
| | Protective Glass G2 | infinity | 0.500 | 1.517 | 64.21 |
| | | infinity | 0.125 | | |
| S16 | Imaging Plane | infinity | — | | |

The aspheric parameters of the seventh lens L7 in this embodiment are listed in Table 6.

TABLE 6

| Surface No. | K | B | C | D | E | F |
|---|---|---|---|---|---|---|
| S12 | −1.939 | −5.483E−4 | 5.845E−5 | −1.288E−6 | −4.058E−8 | 3.642E−9 |
| S13 | −1.630 | 6.623E−4 | −5.289E−5 | 7.584E−6 | −3.863E−7 | 8.841E−9 |

Figure 10:
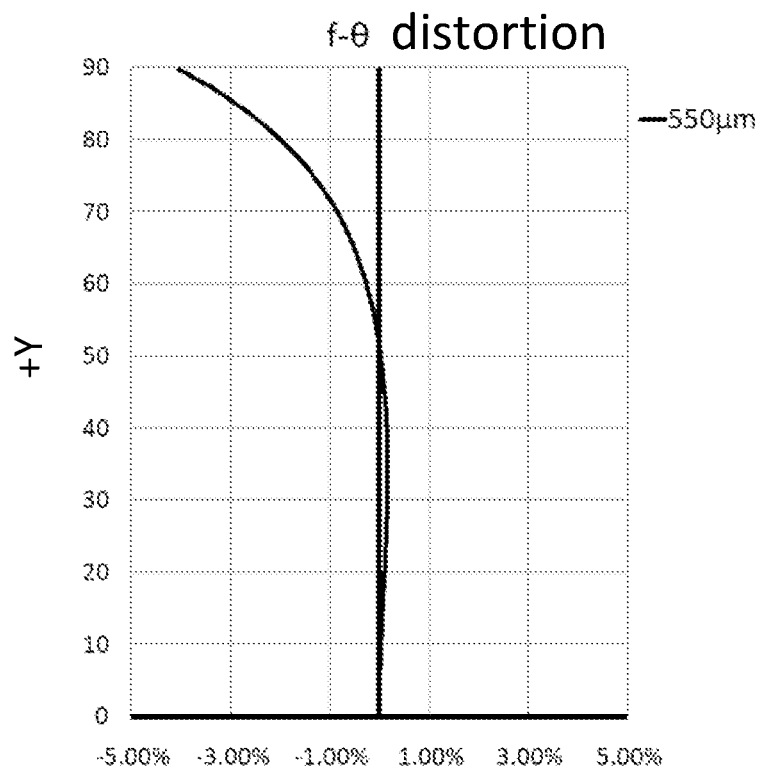
FIG. 10 is an f-θ distortion graph of the ultra-wide angle lens in accordance with the third embodiment of the present disclosure.
Figure 11:
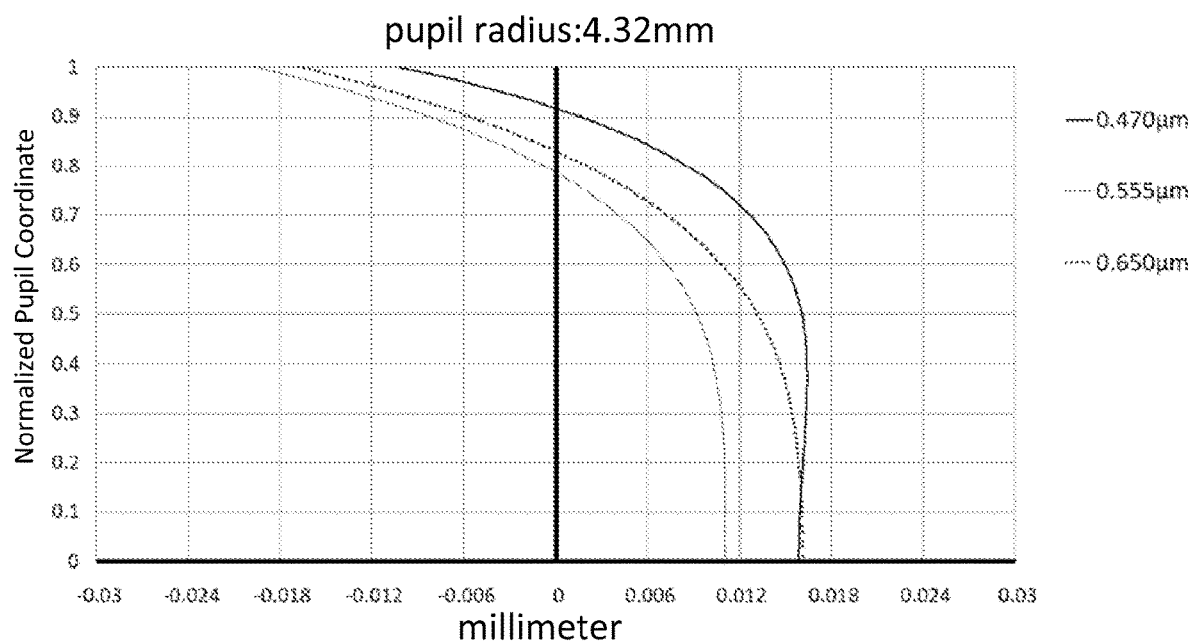
FIG. 11 is an axial chromatic aberration graph of the ultra-wide angle lens in accordance with the third embodiment of the present disclosure.
Figure 12:
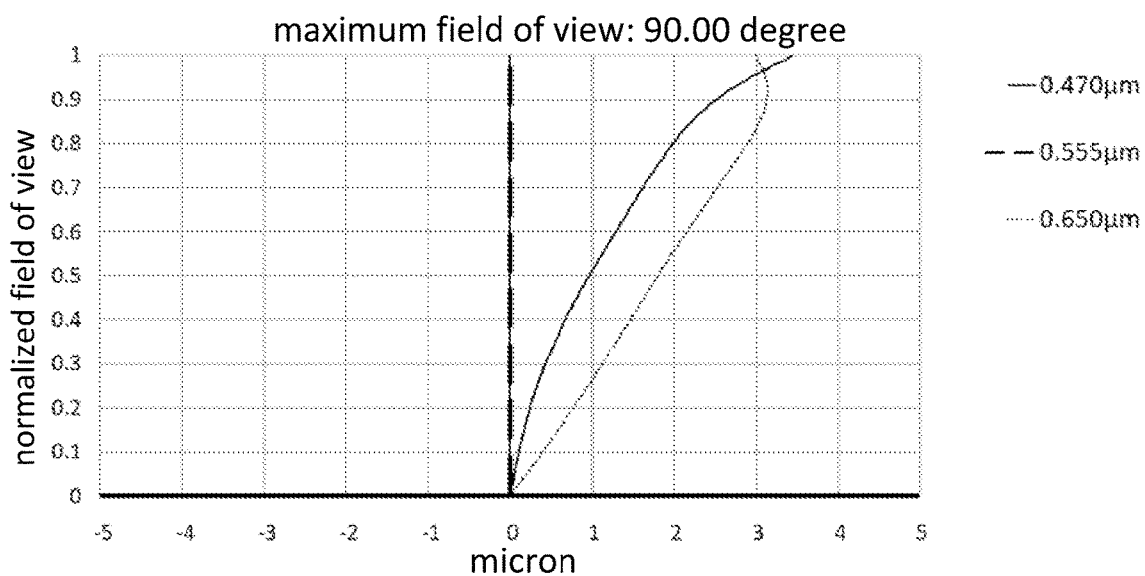
FIG. 12 is a chromatic lateral aberration graph of the ultra-wide angle lens in accordance with the third embodiment of the present disclosure.

In this embodiment, graphs of f-θ distortion, axial chromatic aberration and chromatic lateral aberration of the ultra-wide angle lens 300 are shown in FIG. 10, FIG. 11, and FIG. 12, respectively.

As can be seen from FIG. 10, the optical distortions of the ultra-wide angle lens 300 are within −5% in the full field of view, and are negative distortions, indicating that the distortions have been well corrected.

As can be seen from FIG. 11, the offsets of the axial chromatic aberrations are controlled within ±0.024 millimeter, indicating that the ultra-wide angle lens 300 can effectively correct the aberration of an edge field of view and the secondary spectrum of the entire image plane.

As can be seen from FIG. 12, the chromatic lateral aberrations of the longest wavelength and the shortest wavelength are controlled within ±3.5 microns, indicating that the chromatic lateral aberrations of the ultra-wide angle lens 300 have been well corrected.

Table 7 shows the aforesaid three embodiments and their respective optical characteristics, including the focal length f, f-number F#, field angle 2θ and total track length TTL of the system, as well as the numerical values corresponding to each conditional expression above.

TABLE 7

| | Embodiment 1 | Embodiment 2 | Embodiment 3 |
|---|---|---|---|
| f (mm) | 2.87 | 2.88 | 2.87 |
| F# | 1.85 | 1.860 | 1.85 |
| 2θ | 180° | 180° | 180° |
| TTL (mm) | 27.45 | 27.36 | 27.44 |
| BFL/$T_L$ | 0.15 | 0.19 | 0.13 |
| TTL/f <10 | 9.55 | 9.51 | 9.55 |
| D/$IH_{max}$ | 1.889 | 1.890 | 1.887 |

TABLE 7-continued

| | Embodiment 1 | Embodiment 2 | Embodiment 3 |
|---|---|---|---|
| (f*sinθ)/$IH_{max}$ | 0.665 | 0.669 | 0.671 |
| f1 (mm) | −7.949 | −7.517 | −7.958 |
| R1/R2 | 3.869 | 3.99 | 3.875 |
| f1/f2 | 1.221 | 1.326 | 1.260 |
| f3/f4 + R5/R7 | 2.648 | 2.299 | 2.240 |
| R5 + R6 | 0 | 0 | 0 |
| f5*f6 (mm$^2$) | −18.802 | −16.755 | −17.8063 |
| $\varphi_{behind}/\varphi$ | 0.253 | 0.237 | 0.252 |
| $\varphi 7/\varphi$ | 0.390 | 0.434 | 0.411 |
| (dn/dt)4 + (dn/dt)5 + (dn/dt)6 (/° C.) | −2.1 × 10$^{−6}$ | −2.6 × 10$^{−6}$ | −2.1 × 10$^{−6}$ |
| CT2 (mm) | 0.617 | 0.672 | 0.598 |
| CT12 (mm) | 4.356 | 4.996 | 4.437 |
| CT23 (mm) | 1.543 | 1.035 | 1.51 |
| CT67 (mm) | 1.808 | 1.144 | 1.391 |

The ultra-wide angle lenses provided in the aforesaid embodiments all meet the following optical indicators: (1) field angle: 2θ≥180°; (2) total track length: TTL<27.5 mm; (3) f-number: F#<1.9; and (4) adaptability of 400 nm~720 nm.

In view of the aforesaid embodiments, an ultra-wide angle lens provided in the present disclosure has the following advantages:

(1) The ultra-wide angle lens provided in the present disclosure adopts a design of seven lass lenses, has better thermal stability and stronger mechanical strength, and can effectively cope with the harsh environment of the vehicle, with a small focus drift.

(2) By reasonably allocating the proportions of the focal powers of the lens groups in front of and behind the stop, aberrations in the system are well corrected to provide a clear resolution. The lens group in front of the stop is mainly responsible for collecting light rays, and converting large-angle light rays into smooth ones to be incident into the optical system, facilitating correction to the aberrations; and the lens group behind the stop is responsible for correcting most of the aberrations, and the chromatic lateral aberration of the lens can be effectively corrected when a ratio of the combined focal power of the lens group behind the stop to the focal power of the entire system, i.e., $\varphi_{behind}/\varphi$, is within a certain range.

(3) The ultra-wide angle lens provided in the present disclosure can effectively reduce the field curvature of the ultra-wide angle lens by providing a meniscus lens as the first lens; the second lens having a negative focal power diverges light rays passing through the first lens, and makes the light rays tend to be smooth and transition to the rear of the lens, and the imageable range is up to above 180° by properly matching the first lens and the second lens; both the third lens and the fourth lens are lenses having positive focal powers, thereby effectively sharing the focal power and reducing the tolerance sensitivity of the two lenses so as to lower the costs; the fifth lens and the sixth lens form a bonded body, and a focal length ratio between the positive and negative lenses satisfies the relationship expression, which can effectively correct the field curvature; and the seventh lens adopts an aspherical lens, which can not only reduce the number of lenses and lighten the weight of the lens, but also improve the resolution of the lens and optimize the aberration.

Fourth Embodiment

Figure 13:
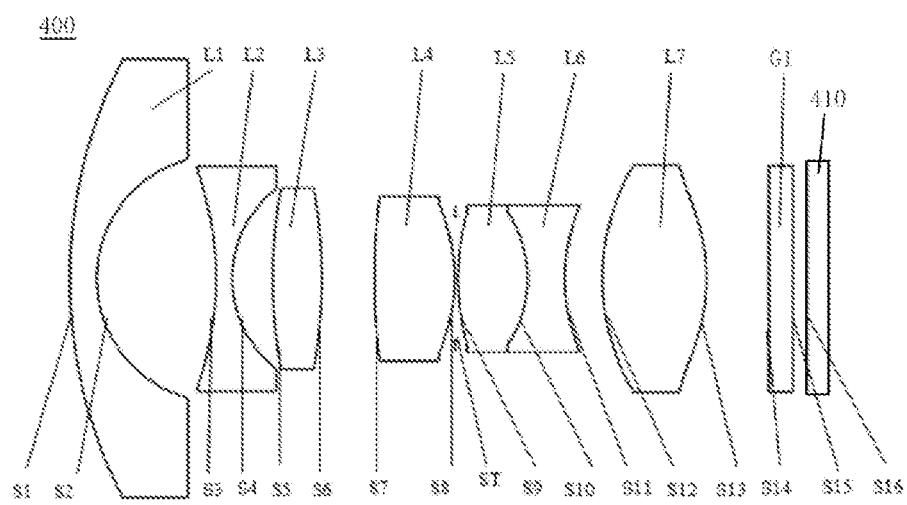
FIG. 13 is a structural schematic diagram of an imaging device provided in accordance with a fourth embodiment of the present disclosure.

Please refer to FIG. 13, which is an imaging device 400 provided in accordance with a fourth embodiment of the present disclosure. The imaging device 400 may include an imaging element 410 and an ultra-wide angle lens in any one of the aforesaid embodiments, such as the ultra-wide angle lens 100. The imaging element 410 may be a CMOS (Complementary Metal Oxide Semiconductor) image sensor, or a CCD (Charge Coupled Device) image sensor.

The imaging device 400 may be a vehicle-mounted camera device, a mobile phone, a tablet computer, or an electronic device of any other form equipped with the aforesaid ultra-wide angle lens.

The imaging device 400 provided in the embodiment of this application includes the ultra-wide angle lens 100. Because the ultra-wide angle lens 100 has the advantages of an ultra-wide angle, a low temperature drift, a low chromatic aberration, and a high resolution, the imaging device 400 having the ultra-wide angle lens 100 also has the advantages of an ultra-wide angle, a low temperature drift, a low chromatic aberration, and a high resolution.

In the description of this specification, the reference to terms such as "one embodiment", "some embodiments", "an example", "a specific example", "some examples" or the like means that the specific features, structures, materials, or characteristics described in view of the embodiment(s) or example(s) are included in at least one embodiment or example of the present disclosure. In this specification, the illustrative expression of the aforesaid terms does not necessarily refer to one and the same embodiment or example. Moreover, the specific features, structures, materials, or characteristics as described can be combined in a suitable manner in any one or more embodiments or examples.

The aforesaid embodiments are only an expression of several modes of implementation of the present disclosure, and described in a more specific and detailed manner, but cannot be thus understood as limitations of the scope of the patent for invention. It should be pointed out that, for those skilled in the art, several deformations and improvements may be further made without departing from the concept of the present disclosure, and these fall within the scope of protection of the present disclosure. Therefore, the scope of protection of the patent for disclosure should be subject to the claims attached hereto.

We claim:

1. An ultra-wide angle lens, from an object side to an imaging plane along an optical axis, sequentially comprising:
   a first lens with a negative focal power, an object side surface of the first lens being convex, and an image side surface of the first lens being concave;
   a second lens with a negative focal power, an object side surface and an image side surface of the second lens both being concave;
   a third lens with a positive focal power, an object side surface and an image side surface of the third lens both being convex;
   a fourth lens with a positive focal power, an object side surface and an image side surface of the fourth lens both being convex;
   a stop;
   a fifth lens with a positive focal power, an object side surface and an image side surface of the fifth lens both being convex;
   a sixth lens with a negative focal power, an object side surface and an image side surface of the sixth lens both being concave, and the fifth lens and the sixth lens forming a bonded body; and
   a seventh lens with a positive focal power, an object side surface and an image side surface of the seventh lens both being paraxially convex,
   wherein the ultra-wide angle lens satisfies a conditional expression below:

$0.23<\varphi_{behind}/\varphi<0.28$, where $\varphi_{behind}$ represents a combined focal power of the fifth lens, the sixth lens, and the seventh lens, and $\varphi$ represents a focal power of the ultra-wide angle lens.

2. The ultra-wide angle lens according to claim 1, wherein the ultra-wide angle lens satisfies conditional expressions below:

$9.5<TTL/f<10$;

$1.8<D/IH_{max}<1.9$, where TTL represents a total track length of the ultra-wide angle lens, f represents a focal length of the ultra-wide angle lens, D represents an effective diameter of the ultra-wide angle lens, and $IH_{max}$ represents a maximum true image height of the ultra-wide angle lens.

3. The ultra-wide angle lens according to claim 1, characterized in that the ultra-wide angle lens satisfies a conditional expression below:

$0.65<f*\sin\theta/IH_{max}<0.70$, where f represents a focal length of the ultra-wide angle lens, $\theta$ represents a half field angle of the ultra-wide angle lens, and $IH_{max}$ represents a maximum true image height of the ultra-wide angle lens.

4. The ultra-wide angle lens according to claim 1, wherein the ultra-wide angle lens satisfies a conditional expression below:

$0.1<BFL/T_L<0.2$, where BFL represents an optical back focal length of the ultra-wide angle lens, and $T_L$ represents a distance from the object side surface of the first lens to the image side surface of the seventh lens on the optical axis.

5. The ultra-wide angle lens according to claim 1, wherein the ultra-wide angle lens satisfies conditional expressions below:

$-8.2\text{ mm}\leq f1<-7.2\text{ mm}$;

$17\text{ mm}<R1<19\text{ mm}$;

$4\text{ mm}<R2<5\text{ mm}$;

$3.6<R1/R2<4.0$, where f1 represents a focal length of the first lens, R1 represents a radius of curvature of the object side surface of the first lens, and R2 represents a radius of curvature of the image side surface of the first lens.

6. The ultra-wide angle lens according to claim 1, wherein the ultra-wide angle lens satisfies a conditional expression below:

$1<f1/f2<1.5$, where f1 represents a focal length of the first lens, and f2 represents a focal length of the second lens.

7. The ultra-wide angle lens according to claim 1, wherein the ultra-wide angle lens satisfies a conditional expression below:

$$2<f3/f4+R5/R7<3,$$

where f3 represents a focal length of the third lens, f4 represents a focal length of the fourth lens, R5 represents a radius of curvature of the object side surface of the third lens, and R7 represents a radius of curvature of the object side surface of the fourth lens.

8. The ultra-wide angle lens according to claim 1, wherein the ultra-wide angle lens satisfies a conditional expression below:

$$-20 \text{ mm}^2 < f5*f6 < -15 \text{ mm}^2,$$

where f5 represents a focal length of the fifth lens, and f6 represents a focal length of the sixth lens.

9. The ultra-wide angle lens according to claim 1, wherein the ultra-wide angle lens satisfies a conditional expression below:

$$0.35<\varphi7/\varphi<0.45,$$

where $\varphi7$ represents a focal power of the seventh lens, and $\varphi$ represents an focal power of the ultra-wide angle lens.

10. The ultra-wide angle lens according to claim 1, characterized in that the ultra-wide angle lens satisfies a conditional expression below:

$$-3\times10^{-6}/°\text{C}.<(dn/dt)4+(dn/dt)5+(dn/dt)6<-2\times10^{-6}/°\text{C}.;$$

where (dn/dt)4 represents a temperature coefficient of material refractive index of the fourth lens, (dn/dt)5 represents a temperature coefficient of material refractive index of the fifth lens, and (dn/dt)6 represents a temperature coefficient of material refractive index of the sixth lens.

11. The ultra-wide angle lens according to claim 1, wherein the ultra-wide angle lens satisfies a conditional expression below:

$$0.5 \text{ mm}<CT2<0.68 \text{ mm};$$

$$4.0 \text{ mm}<CT12<5.2 \text{ mm};$$

$$0.95 \text{ mm}<CT23<1.7 \text{ mm};$$

$$1.0 \text{ mm}<CT67<2.0 \text{ mm},$$

where CT2 represents a center thickness of the second lens, CT12 represents a spacing distance between the first lens and the second lens on the optical axis, CT23 represents a spacing distance between the second lens and the third lens on the optical axis, and CT67 represents a spacing distance between the sixth lens and the seventh lens on the optical axis.

12. The ultra-wide angle lens according to claim 1, wherein the first lens, the second lens, the third lens, the fourth lens, the fifth lens, and the sixth lens are glass spherical lenses, and the seventh lens is a glass aspherical lens; and the third lens satisfies a conditional expression: R5+R6=0, where R5 represents a radius of curvature of the object side surface of the third lens, and R6 represents a radius of curvature of the image side surface of the third lens.

13. An imaging device, comprising an ultra-wide angle lens and an imaging element for converting an optical image formed by the ultra-wide angle lens into an electrical signal, the ultra-wide angle lens, from an object side to an imaging plane along an optical axis, sequentially comprising:

a first lens with a negative focal power, an object side surface of the first lens being convex, and an image side surface of the first lens being concave;

a second lens with a negative focal power, an object side surface and an image side surface of the second lens both being concave;

a third lens with a positive focal power, an object side surface and an image side surface of the third lens both being convex;

a fourth lens with a positive focal power, an object side surface and an image side surface of the fourth lens both being convex;

a stop;

a fifth lens with a positive focal power, an object side surface and an image side surface of the fifth lens both being convex;

a sixth lens with a negative focal power, an object side surface and an image side surface of the sixth lens both being concave, and the fifth lens and the sixth lens forming a bonded body; and a seventh lens with a positive focal power, an object side surface and an image side surface of the seventh lens both being paraxially convex, wherein the ultra-wide angle lens satisfies a conditional expression below:

$$0.23<\varphi_{behind}/\varphi<0.28,$$

where $\varphi_{behind}$ represents a combined focal power of the fifth lens, the sixth lens, and the seventh lens, and $\varphi$ represents a focal power of the ultra-wide angle lens.

14. The imaging device according to claim 13, wherein the ultra-wide angle lens satisfies conditional expressions below:

$$9.5<TTL/f<10;$$

$$1.8<D/IH_{max}<1.9,$$

where TTL represents a total track length of the ultra-wide angle lens, f represents a focal length of the ultra-wide angle lens, D represents an effective diameter of the ultra-wide angle lens, and $IH_{max}$ represents a maximum true image height of the ultra-wide angle lens.

15. The imaging device according to claim 13, wherein the ultra-wide angle lens satisfies a conditional expression below:

$$0.65<f*\sin\theta/IH_{max}<0.70,$$

where f represents a focal length of the ultra-wide angle lens, $\theta$ represents a half field angle of the ultra-wide angle lens, and $IH_{max}$ represents a maximum true image height of the ultra-wide angle lens.

16. The imaging device according to claim 13, wherein the ultra-wide angle lens satisfies a conditional expression below:

$$0.1<BFL/T_L<0.2,$$

where BFL represents an optical back focal length of the ultra-wide angle lens, and $T_L$ represents a distance from the object side surface of the first lens to the image side surface of the seventh lens on the optical axis.

17. The imaging device according to claim 13, wherein the ultra-wide angle lens satisfies conditional expressions below:

$$-8.2 \text{ mm} < f1 < -7.2 \text{ mm};$$

$$17 \text{ mm} < R1 < 19 \text{ mm};$$

$$4 \text{ mm} < R2 < 5 \text{ mm};$$

$$3.7 < R1/R2 < 4.0,$$

where f1 represents a focal length of the first lens, R1 represents a radius of curvature of the object side surface of the first lens, and R2 represents a radius of curvature of the image side surface of the first lens.

18. The imaging device according to claim 13, wherein the ultra-wide angle lens satisfies a conditional expression below:

$$1 < f1/f2 < 1.5,$$

where f1 represents a focal length of the first lens, and f2 represents a focal length of the second lens.

19. The imaging device according to claim 13, wherein the ultra-wide angle lens satisfies a conditional expression below:

$$2 < f3/f4 + R5/R7 < 3,$$

where f3 represents a focal length of the third lens, f4 represents a focal length of the fourth lens, R5 represents a radius of curvature of the object side surface of the third lens, and R7 represents a radius of curvature of the object side surface of the fourth lens;

wherein the ultra-wide angle lens satisfies a conditional expression below:

$$-20 \text{ mm}^2 < f5*f6 < -15 \text{ mm}^2,$$

where f5 represents a focal length of the fifth lens, and f6 represents a focal length of the sixth lens;

wherein the ultra-wide angle lens satisfies a conditional expression below:

$$0.35 < \varphi7/\varphi < 0.45,$$

where $\varphi7$ represents a focal power of the seventh lens, and $\varphi$ represents an focal power of the ultra-wide angle lens;

wherein the ultra-wide angle lens satisfies a conditional expression below:

$$-3 \times 10^{-6}/°\text{C.} < (dn/dt)4 + (dn/dt)5 + (dn/dt)6 < -2 \times 10^{-6}/°\text{C.};$$

where (dn/dt)4 represents a temperature coefficient of material refractive index of the fourth lens, (dn/dt)5 represents a temperature coefficient of material refractive index of the fifth lens, and (dn/dt)6 represents a temperature coefficient of material refractive index of the sixth lens;

wherein the ultra-wide angle lens satisfies a conditional expression below:

$$0.5 \text{ mm} < CT2 < 0.68 \text{ mm};$$

$$4.0 \text{ mm} < CT12 < 5.2 \text{ mm};$$

$$0.95 \text{ mm} < CT23 < 1.7 \text{ mm};$$

$$1.0 \text{ mm} < CT67 < 2.0 \text{ mm},$$

where CT2 represents a center thickness of the second lens, CT12 represents a spacing distance between the first lens and the second lens on the optical axis, CT23 represents a spacing distance between the second lens and the third lens on the optical axis, and CT67 represents a spacing distance between the sixth lens and the seventh lens on the optical axis.

20. The imaging device according to claim 13, wherein the first lens, the second lens, the third lens, the fourth lens, the fifth lens, and the sixth lens are glass spherical lenses, and the seventh lens is a glass aspherical lens; and the third lens satisfies a conditional expression: R5+R6=0, where R5 represents a radius of curvature of the object side surface of the third lens, and R6 represents a radius of curvature of the image side surface of the third lens.

* * * * *